United States Patent

[11] 3,587,808

[72] Inventors Albert F. Romanowski
 Greeneville;
 Larry A. May, Jonesboro; Norman W. Hays, Telford, Tenn.
[21] Appl. No. 791,922
[22] Filed Jan. 17, 1969
[45] Patented June 28, 1971
[73] Assignee Bowser, Inc.

[54] FLUID PUMP HAVING PULSING MEANS AND MONEY ACCUMULATOR
17 Claims, 15 Drawing Figs.

[52] U.S. Cl. .................................................. 194/13
[51] Int. Cl. .................................................. G07f 13/00
[50] Field of Search .......................................... 194/13, 10, 3; 222/20, 2, 194 (Inquired)l(change makers)

[56] References Cited
UNITED STATES PATENTS
2,573,112 10/1951 Schneckenburger ......... 194/3
2,679,308 5/1954 Moore et al. ................. 194/13

Primary Examiner—Stanley H. Tollberg
Attorney—Jeffers and Young

ABSTRACT: A control and change making device is provided for a fluid dispensing pump to receive money deposited by a customer and store information signals indicative of the amount of money received. As fluid is dispensed, pulses are produced to reduce the amount of stored information signals until the desired amount of fluid is dispensed. When the amount of fluid dispensed represents the amount of money received, the dispensing is automatically stopped. If the amount of fluid dispensed is less than the amount of money deposited, the customer may operate a circuit to receive the proper amount of change. As the change is given, the stored information signals are reduced until no information signals remain, at which time no further change is provided.

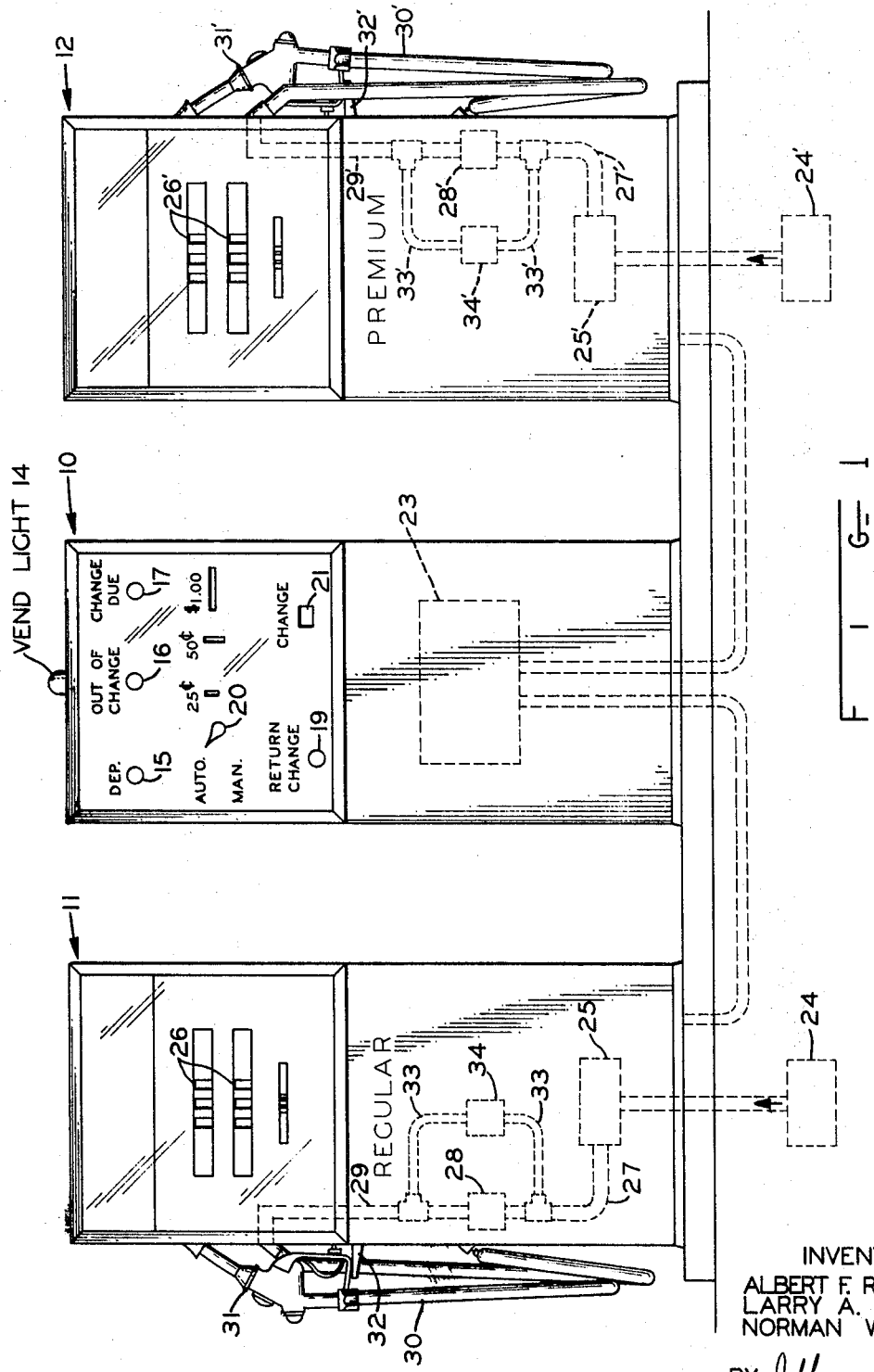

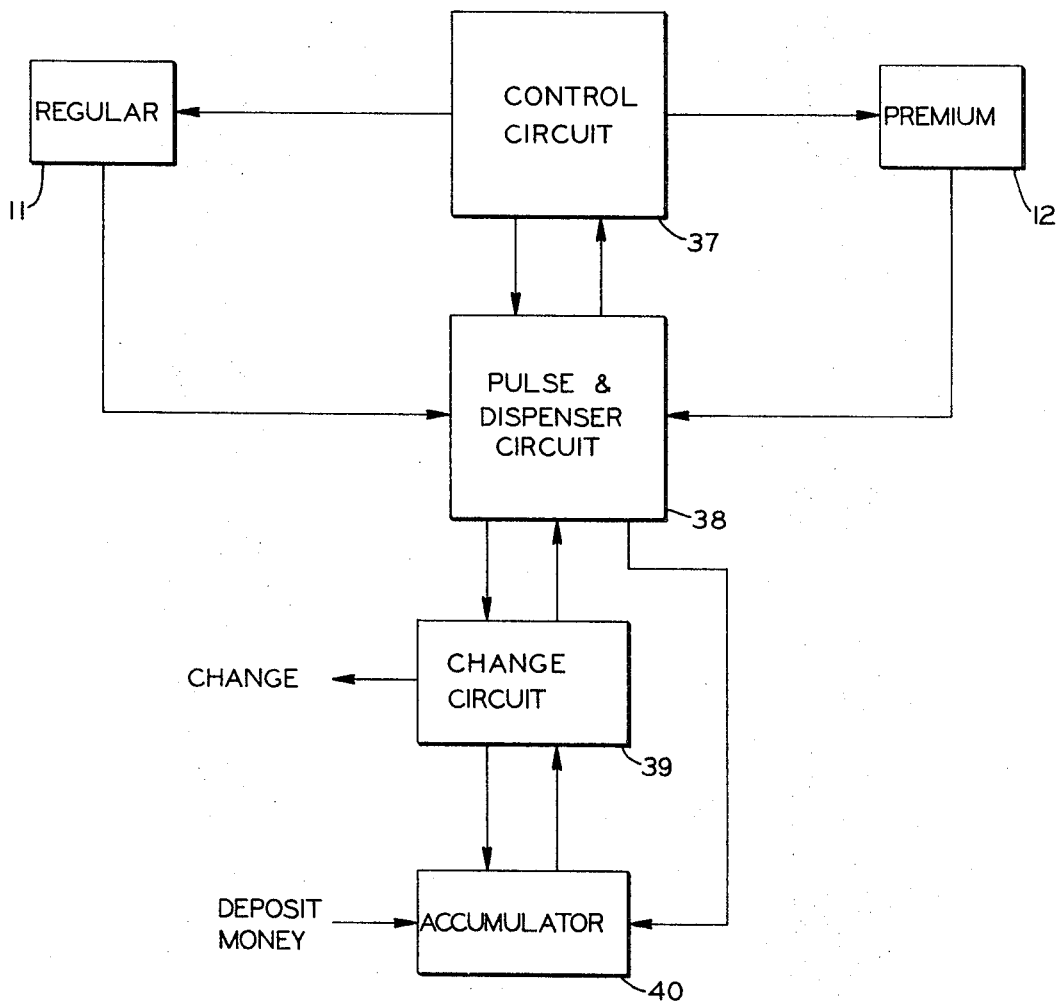

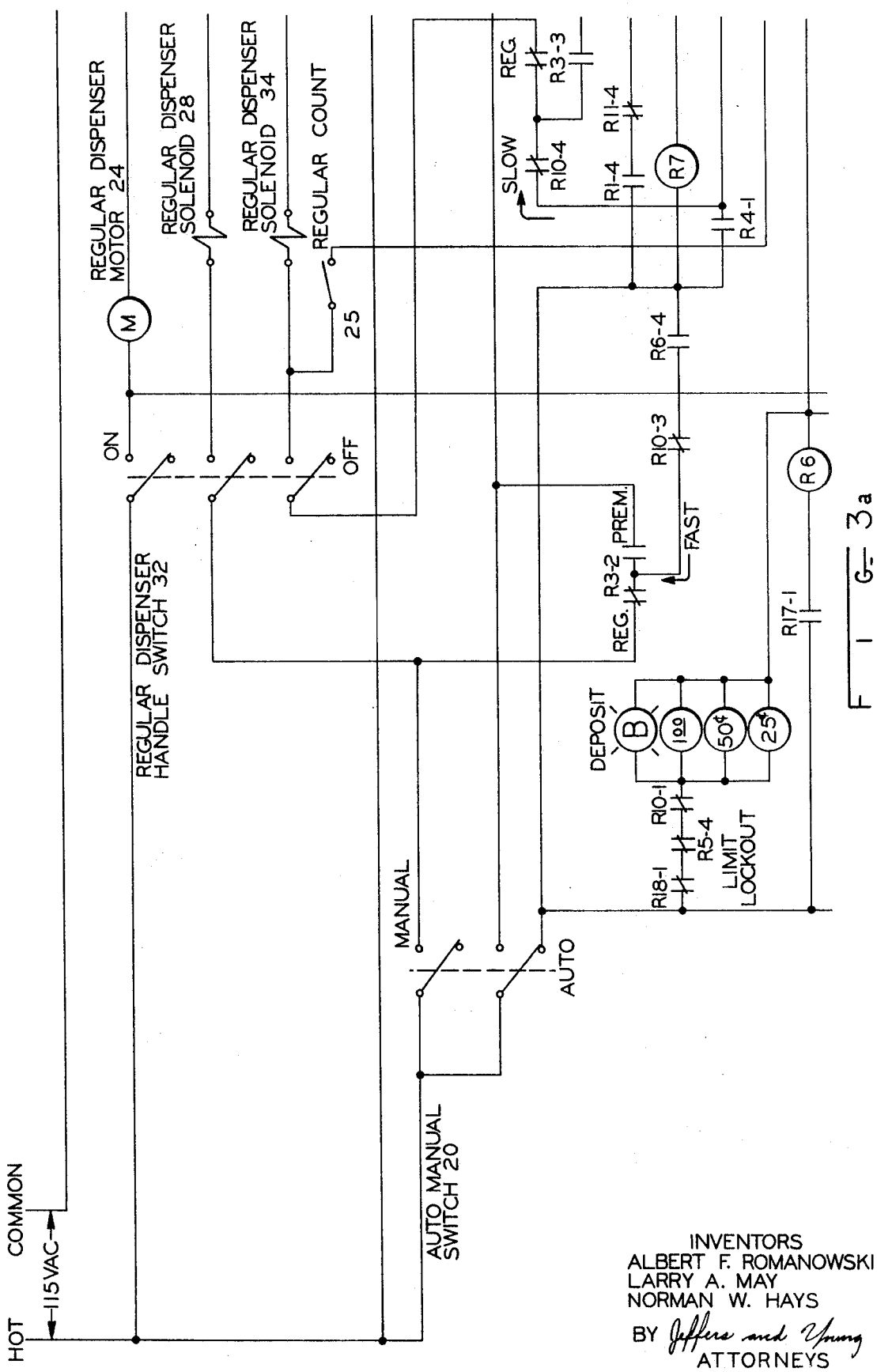

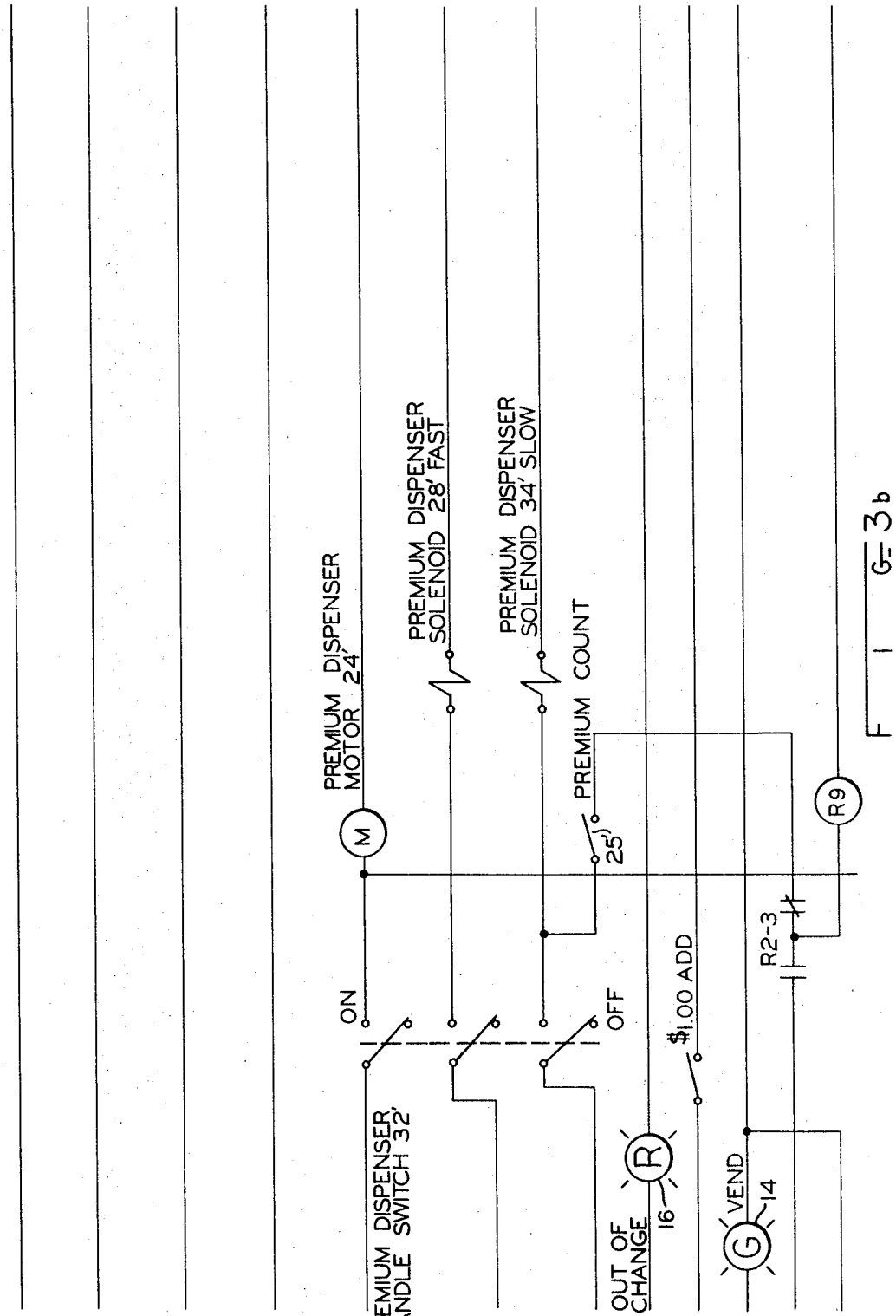

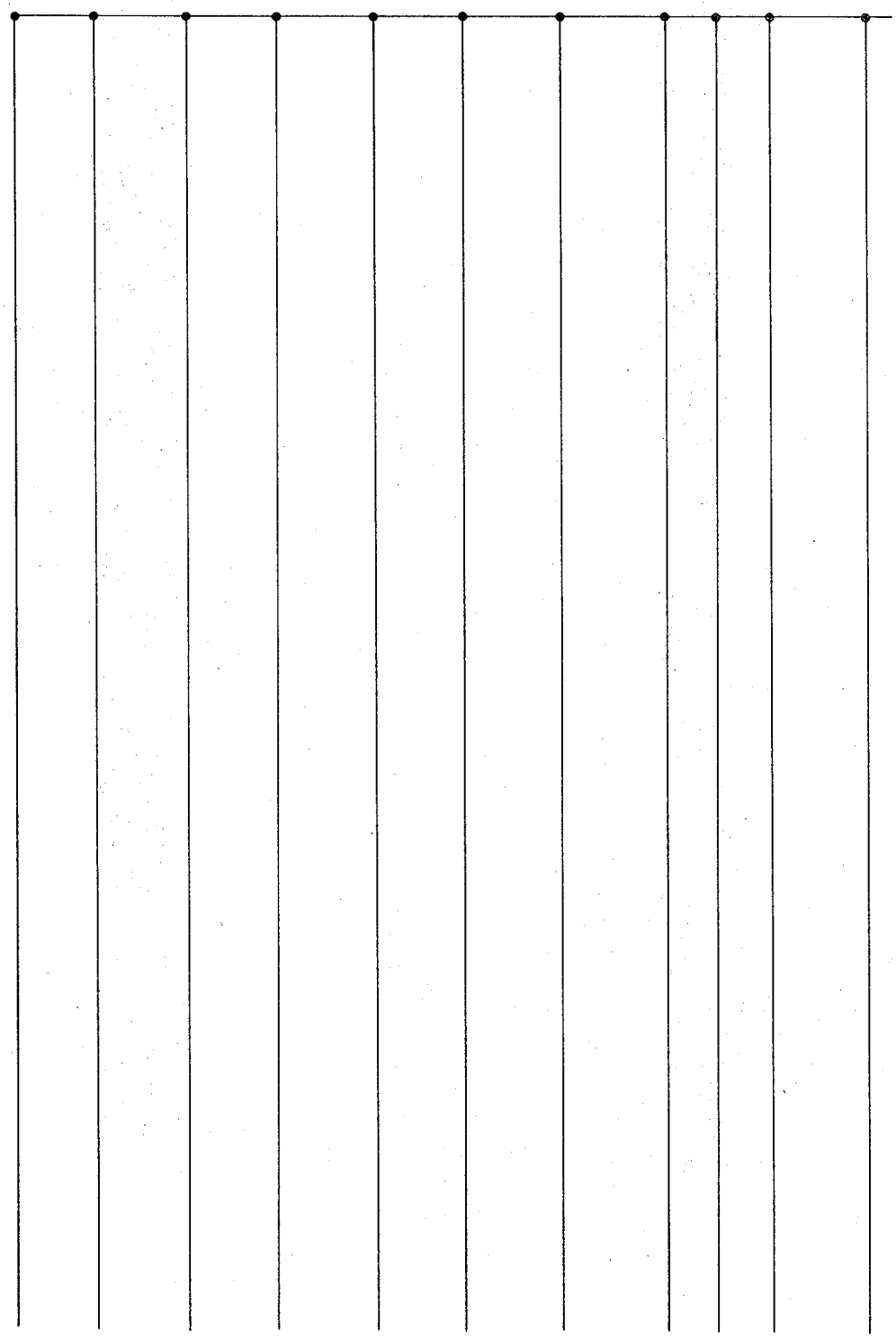

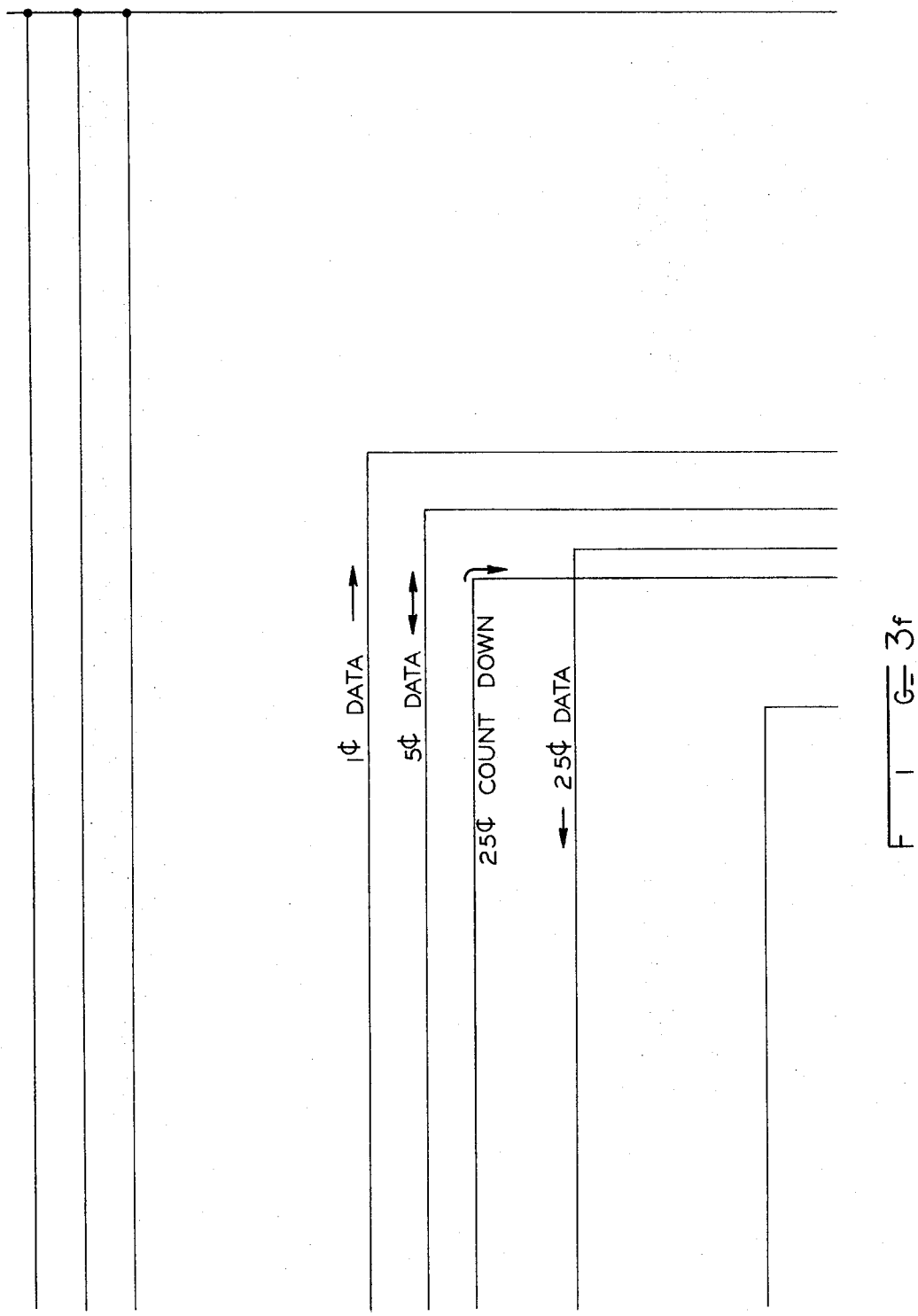

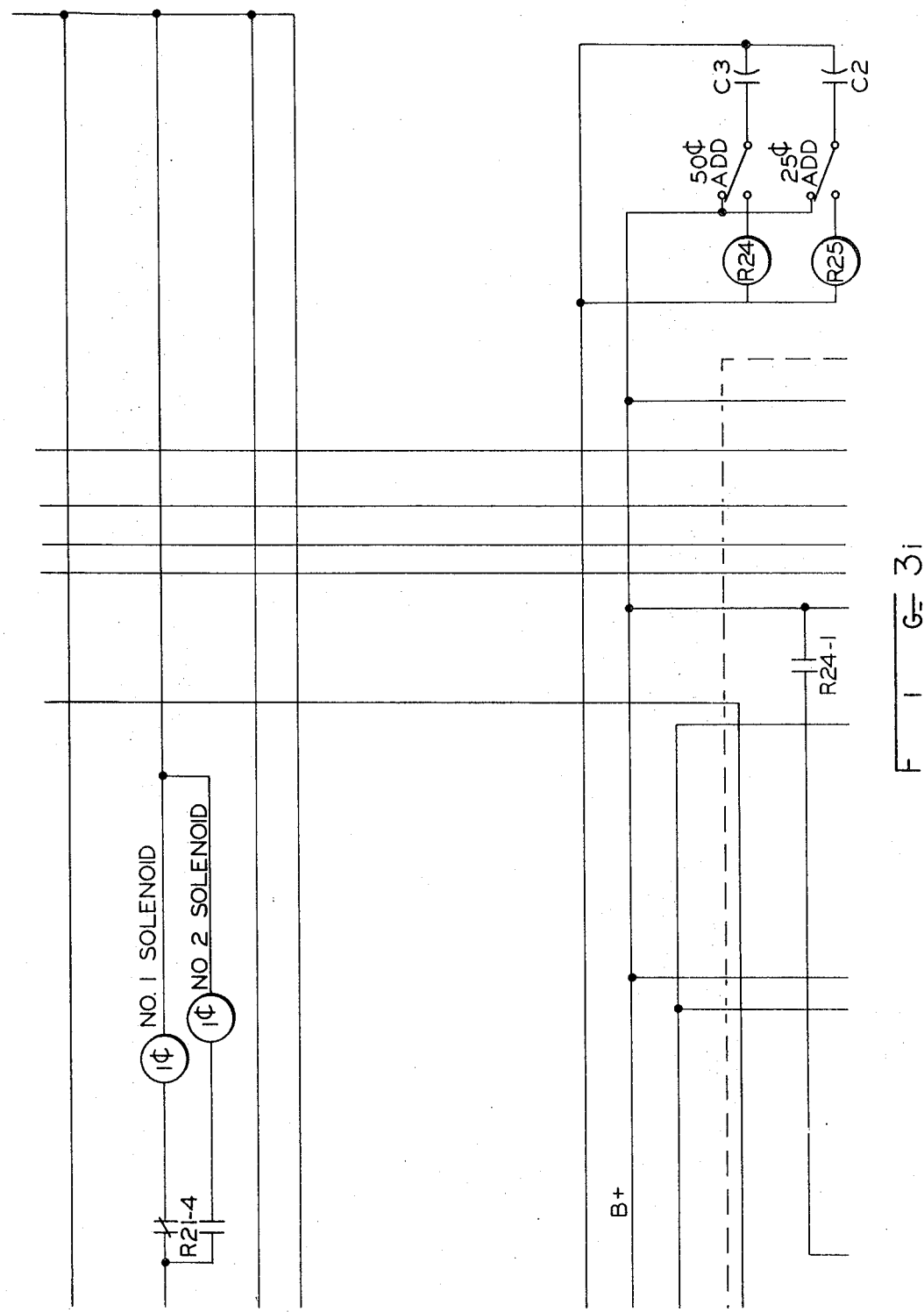

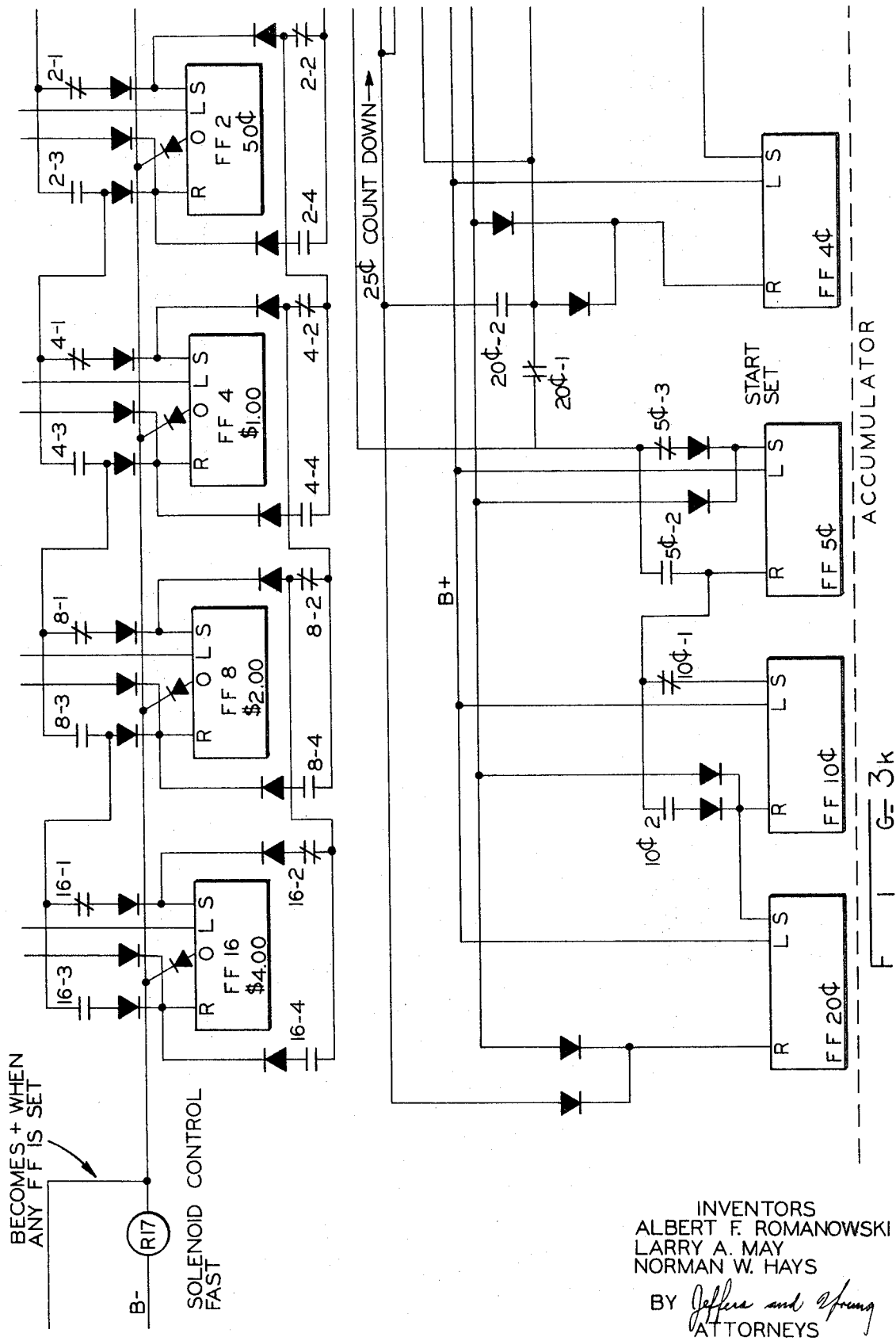

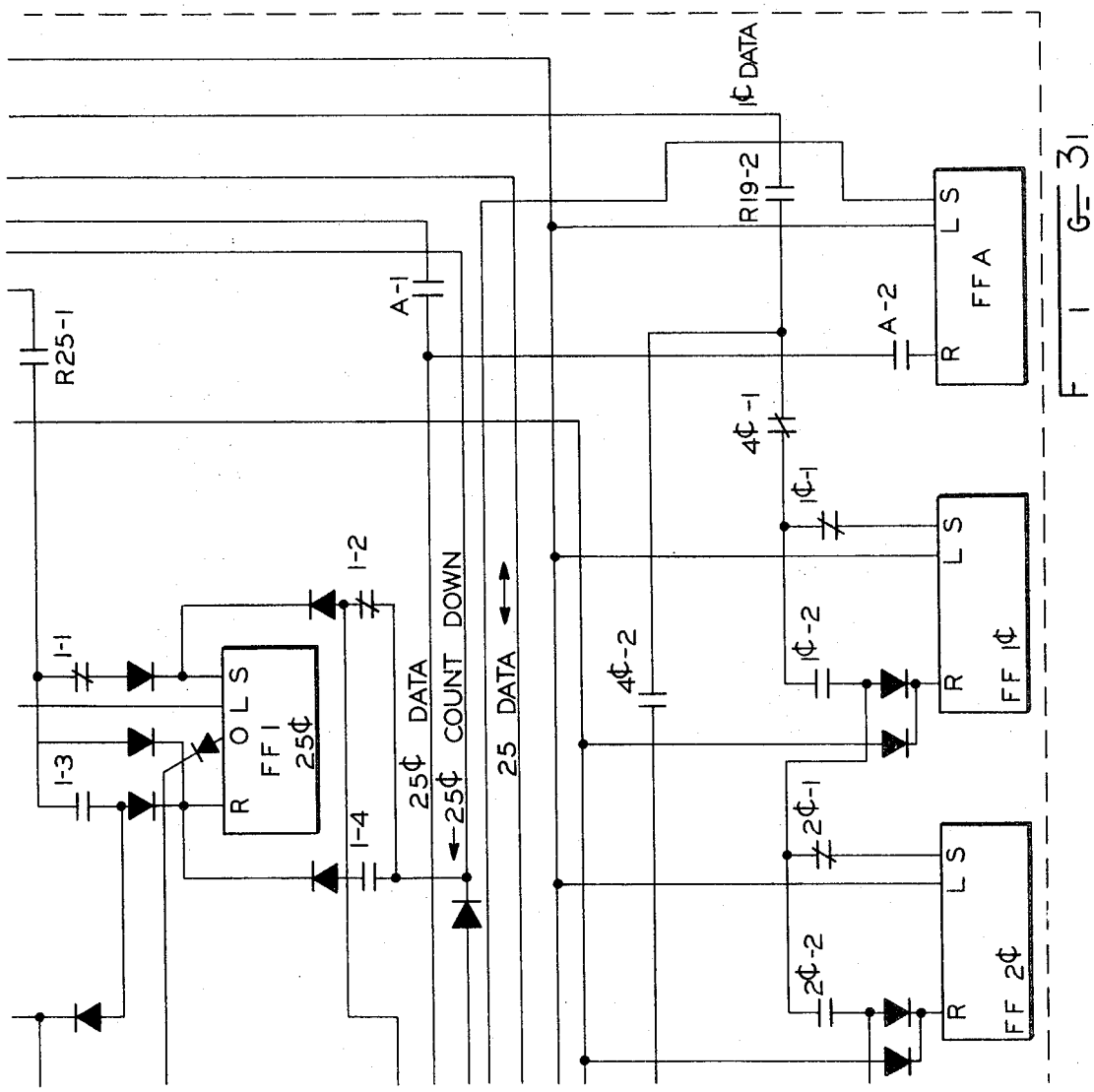

| FIG. 3a | FIG. 3b | FIG. 3c |
| --- | --- | --- |
| FIG. 3d | FIG. 3e | FIG. 3f |
| FIG. 3g | FIG. 3h | FIG. 3i |
| FIG. 3j | FIG. 3k | FIG. 3l |

FIG. 4

INVENTORS
ALBERT F. ROMANOWSKI
LARRY A. MAY
NORMAN W. HAYS

BY *Jeffers and Young*
ATTORNEYS

FLUID PUMP HAVING PULSING MEANS AND MONEY ACCUMULATOR

BACKGROUND OF THE INVENTION

Our invention relates to a control and change making device, and particularly to such a device for self-service gasoline dispensing pumps.

Monetary operated or monetary controlled dispensing pump arrangements are known in the art, such as exemplified by U.S. Pat. No. 3,360,094 granted Dec. 26, 1967. While such arrangements are satisfactory, we have found that customers frequently deposit more money into the apparatus than necessary. This results either from the fact that the customer does not have the proper change to purchase the desired amount of gasoline, or from the fact that the customer's gasoline tank may not hold as much gasoline as represented by the amount of money deposited. In either case, where such devices are used, it is desirable, and in some cases essential, that apparatus be provided so that the proper amount of change can be automatically and accurately supplied to the customer.

Accordingly, an object of our invention is to provide a new and improved control and change making device, particularly for gasoline dispensing pumps.

Another object of our invention is to provide an improved control and change making device that receives money, that permits the desired amount of gasoline to be accurately dispensed by the customer, and that then returns the proper amount of change to the customer.

Another object of our invention is to provide an improved control and change making device that dispenses gasoline at two selected rates of flow, the last rate being a slower one so that the fluid dispensing can be accurately cutoff to provide the customer with the proper amount of gasoline.

While our device is useful in self-service gasoline stations, operators prefer that the device not be used as a change making machine. Such change making machines are frequently abused by the public, and do not sell gasoline for the operator.

Accordingly, another object of our invention is to provide an improved change making device for gasoline dispensing pumps which requires any selected minimum amount of gasoline to be dispensed before the device will provide change back to the customer.

In addition to the above desirable features, operators frequently sell various grades of gasoline. Where two or more grades of gasoline are dispensed, it is desirable that the control and change making device be usable with all of such grades of gasoline.

Accordingly, another object of our invention is to provide an improved control and change making device that can be selectively used with one of a plurality of gasoline dispensing pumps.

SUMMARY OF THE INVENTION

Briefly, these and other objects are achieved in accordance with our invention in connection with a gasoline dispensing pump which has means for producing pulses as a function of the monetary amount of gasoline dispensed by the pump. The device has means for receiving money and producing information signals as a function of the amount of money received. These information signals are applied to the input of an accumulator which stores information signals as a function of the money received. A money counter is coupled to the pulse producing means of a dispensing pump. A selectively operable pulse circuit is also coupled to the money counter. Means are provided to couple the money counter output to the accumulator input to reduce the information signals stored in the accumulator as a function of pulses supplied to the money counter either from the dispensing pump or from the pulse circuit. When the number of pulses supplied to the money counter represents the amount of money supplied to the money receiving means, the accumulator produces a signal that stops the dispensing. Or, if the accumulator still retains stored information signals after the desired amount of fluid has been dispensed, change may be provided by operating the pulse circuit to produce pulses to reduce the number of information signals in the accumulator to zero. As this takes place, change is supplied to provide the difference between the amount of money deposited and the monetary value of fuel dispensed.

BRIEF DESCRIPTION OF THE DRAWING

The subject matter which we regard as our invention is particularly pointed out and distinctly claimed in the claims. The structure and operation of our invention, together with further objects and advantages, may be better understood from the following description given in connection with the accompanying drawing, in which:

FIG. 1 is an elevation view of two gasoline dispensing pumps and a control and change making device in accordance with our invention;

FIG. 2 is a simplified block diagram of our control and change making device in accordance with our invention;

FIG. 4 shows a diagram illustrating how FIGS. 3a through 3i are to be arranged together to form a complete diagram.

DESCRIPTION OF THE PREFERRED EMBODIMENT

General

Figure 3D:
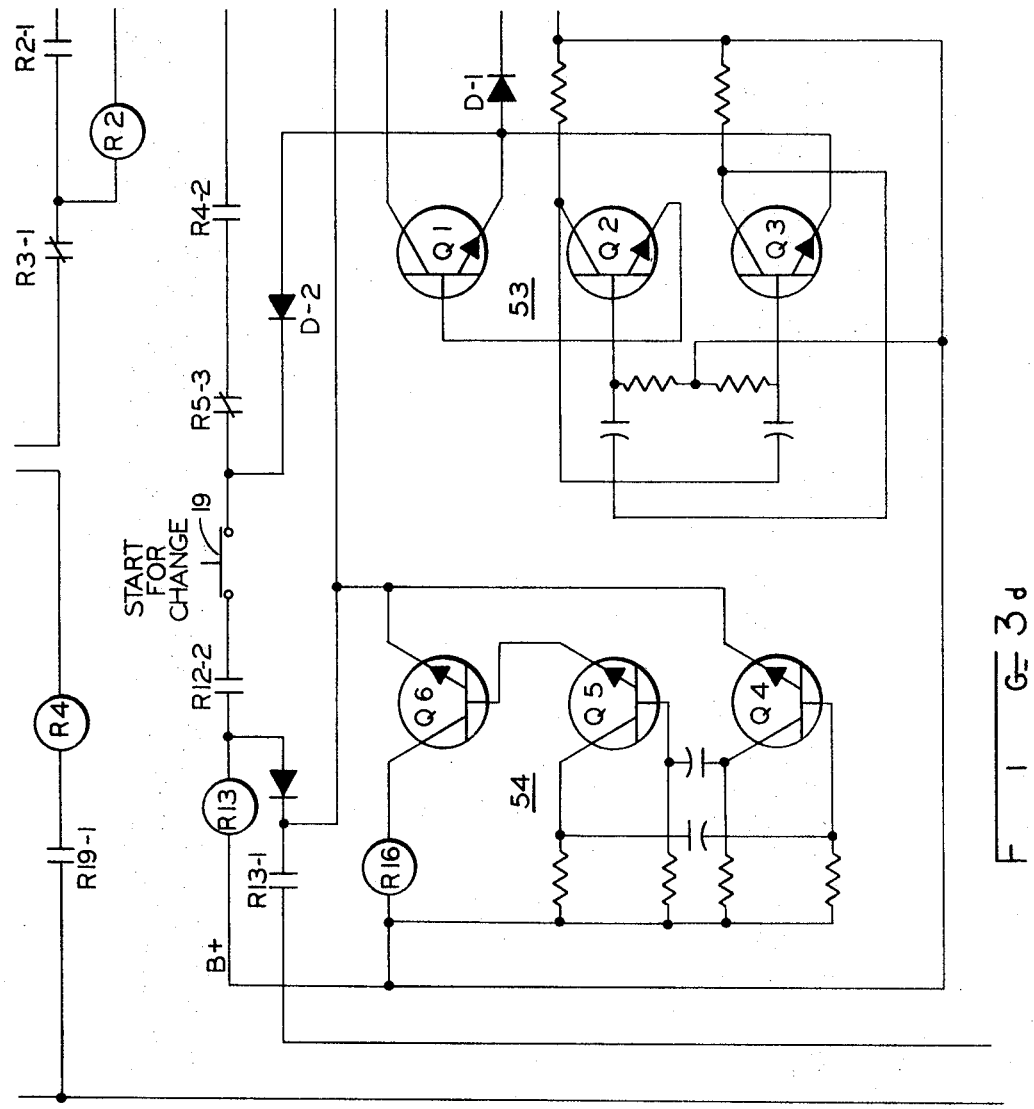
FIGS. 3a through 3i show a schematic diagram of a preferred embodiment of our control and change making device in accordance with our invention.

In FIG. 1, we have shown a view of a gasoline station embodying our invention. In the gasoline station shown, we have assumed that our control and change making device is positioned in a central housing 10 that is located conveniently, such as between a regular gasoline pump 11 and a premium or high test gasoline pump 12. Our control and change making device is intended to be completely automatic and operable by a customer, so that the housing 10 is provided with a number of lights and fixtures. The housing 10 is provided with a vending light 14 that indicates that one of the pumps 11, 12 is ready for or is in operation. The housing 10 also includes a deposit light 15 which indicates that our control and change making device will accept money for deposit. An out-of-change light 16 is provided to indicate to a customer that the control and change making device does not have sufficient change to return money to a customer, and thus warn the customer not to deposit money in excess of what his tank will hold. A change due light 17 is provided to remind a customer and the operator that change is due. We provide a return change button 19 to initiate return of change. An automatic-manual switch 20 is provided so that the pumps 11, 12 can be operated manually in a typical fashion, or can be operated automatically by a customer. The housing 10 also includes slots or openings for accepting various coins, and in this case we have assumed that only 25 cent pieces, 50 cent pieces, and 1 dollar bills can be deposited. A change return slot or opening 21 is provided for the customer to receive any change that may be due him.

A control and change making device 23 in accordance with our invention is mounted within the housing 10, and is connected by suitable electrical lines or conduits, indicated by the dashed lines, to the pumps 11, 12. The regular pump 11 has a motor and pump 24 suitably positioned for pumping gasoline from a tank to a meter 25. The meter 25 is provided with suitable gears or other connections to provide gallons and money indications at windows 26, and also to provide electrical pulses at a rate indicative of the rate of dispensing of gasoline. Preferably, the meter 25 and associated read out device is arranged to produce one electrical pulse or one electrical circuit closure for each 1 cent of gasoline dispensed. The output from the meter 25 is supplied to a main pipe 27 which leads through a solenoid control valve 28 to an output pipe 29. The output pipe 29 goes to a suitable hose 30 and nozzle 31 which are positioned on the outside of the pump 11. Typically, the handle of the nozzle 31 rests on a handle switch 32 which can be operated after nozzle 31 is removed. Again with reference to the main pipe 27 and the output pipe 29, a smaller or slow delivery pipe 33 is shunted around the solenoid control valve 28 through its own solenoid control valve 34. The smaller or slow delivery pipe 33 is provided so that when the delivery for a particular amount of deposit is almost complete, delivery of gasoline can take place only through the smaller pipe 33 at a relatively slow rate. Thus, when the amount of gasoline dispensed equals the amount of money deposited, the small rate of gasoline flow is quickly and accurately cutoff by the solenoid control valve 34. This assures the customer that he gets the full amount of gasoline paid for, and also insures the operator that the customer does not get gasoline not paid for.

The premium pump 12 is similar in construction and arrangement to the regular pump 11, and has the same features and devices mentioned in connection with the regular pump 11. These devices and features are shown with the same reference numerals followed by a prime. Hence, a description of these devices will not be given.

In FIG. 2, we have shown a simplified block diagram of our control and change making device 23 of FIG. 1. The device 23 includes a control circuit 37 which controls the operation and function of the regular and premium pumps 11, 12. The control circuit 37 is also connected to a pulse and dispenser circuit 38. The pulse and dispenser circuit 38 is also connected to the regular and premium pumps 11, 12 for receiving pulses or circuit operations indicative of dispensing. The pulse and dispenser circuit 38 is connected to a change circuit 39 which provides change to the customer after gasoline has been dispensed, and if change is due. The change circuit 39 is connected to an accumulator 40. The accumulator 40 is an important part of our control and change making device 23. The accumulator 40 provides means for storing information indicative of the amount of money deposited by a customer and reducing this stored information in response to pulses produced by the regular or premium pumps 11, 12. After gasoline has been dispensed, if there is any information still stored in the accumulator 40, then the pulse and dispense circuit 38 can be operated by the customer to cause the change circuit 39 to provide the customer with change. Simultaneously, pulses from the pulse and dispenser circuit 38 reduce the information stored in the accumulator 40 as change is returned, so that when the accumulator 40 has no further information stored, then no more change is returned to the customer. Thus, our control and change making device permits a gasoline station to be operated without an attendant, so that a customer can deposit money, dispense his own gasoline, and then get whatever change is due.

Detailed

Figure 3E:
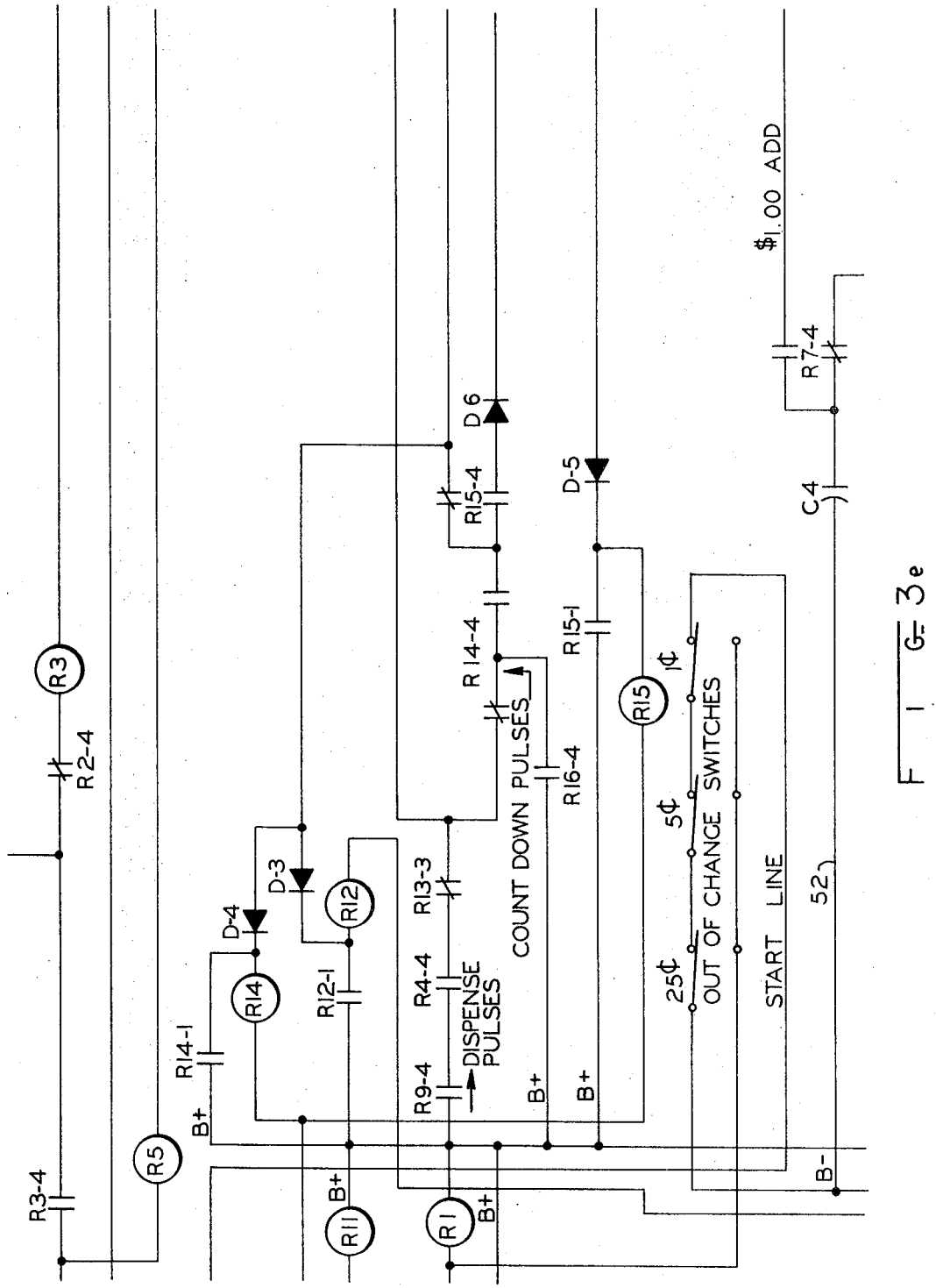
Figure 3G:
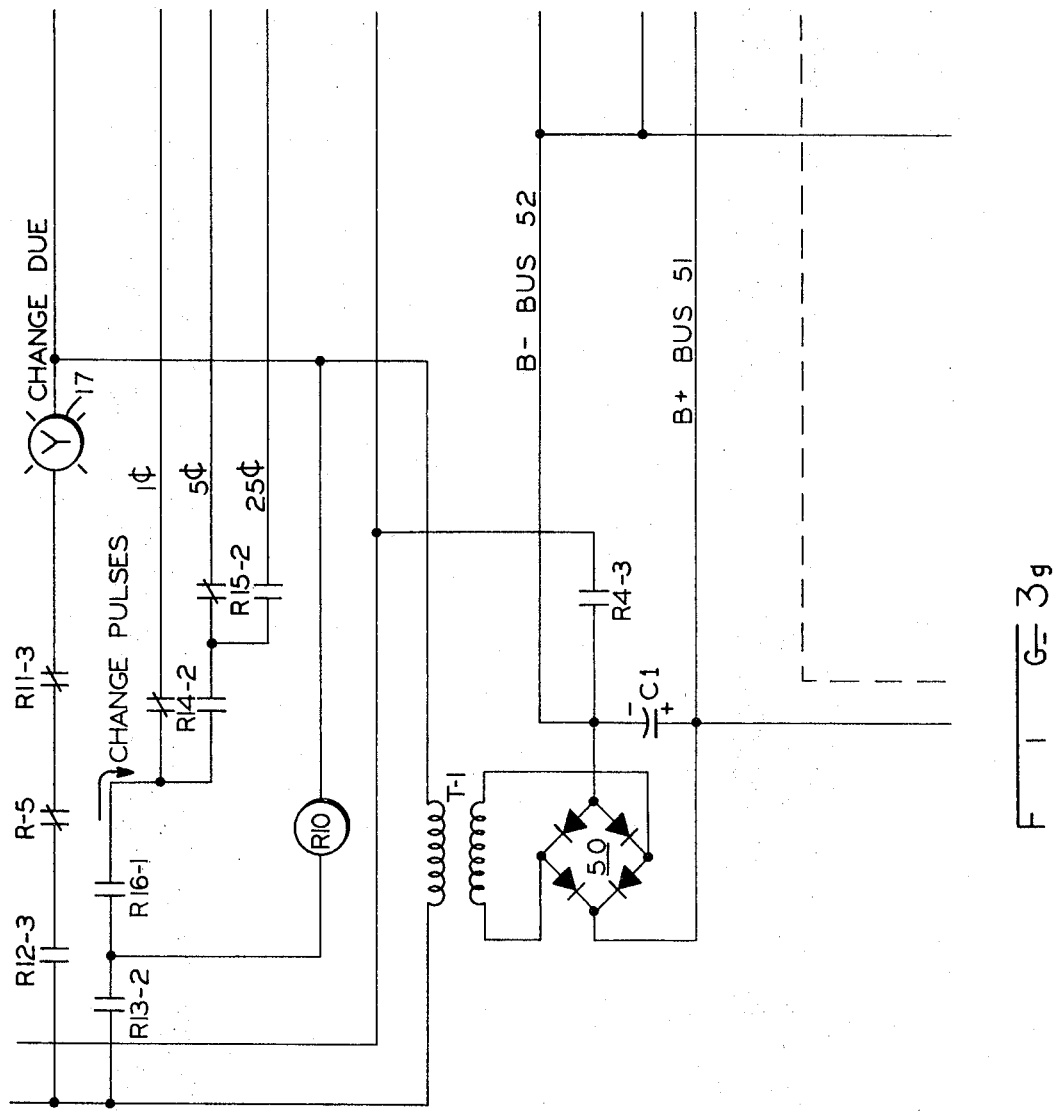
Figure 3H:
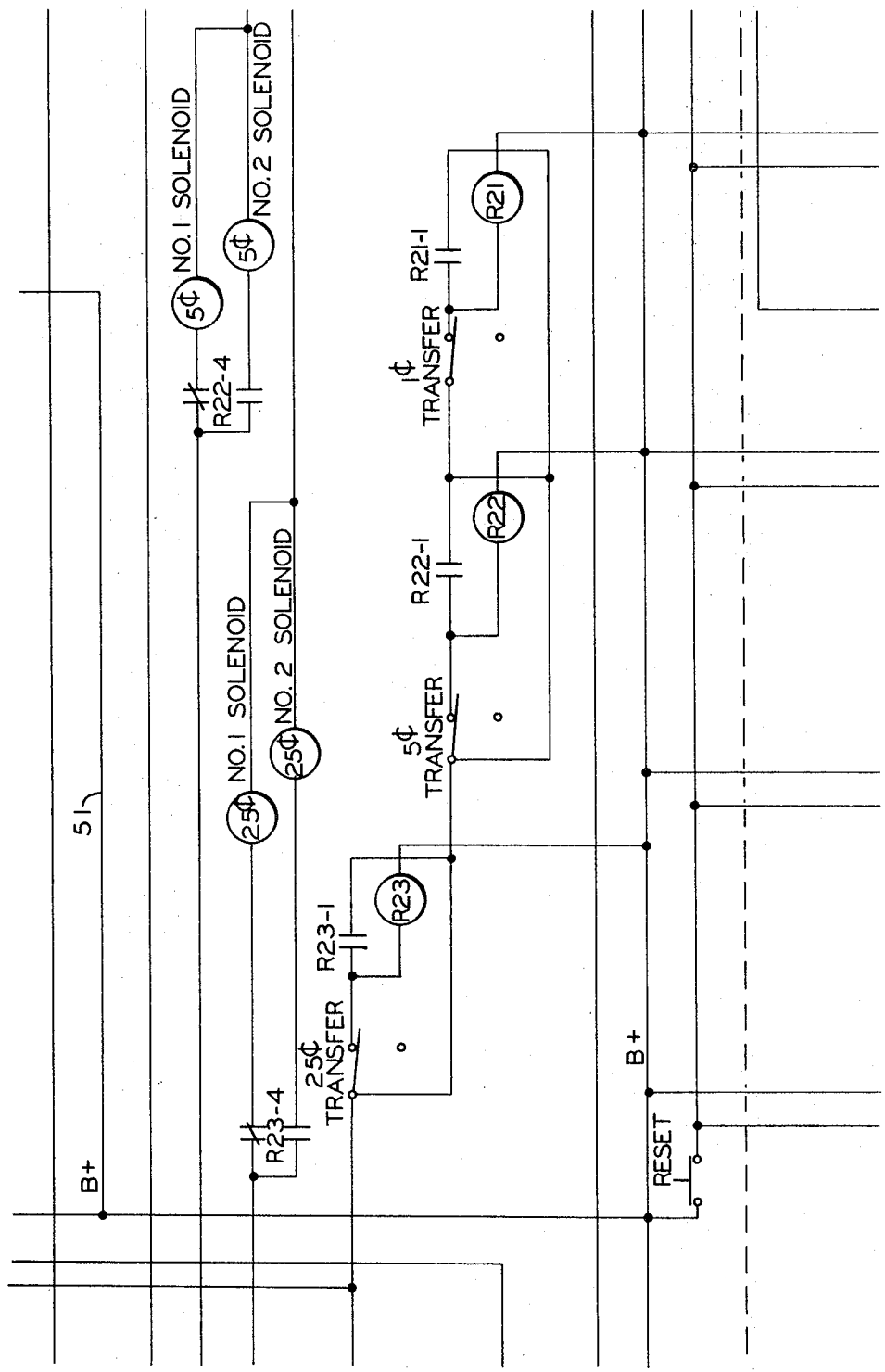
Figure 3J:
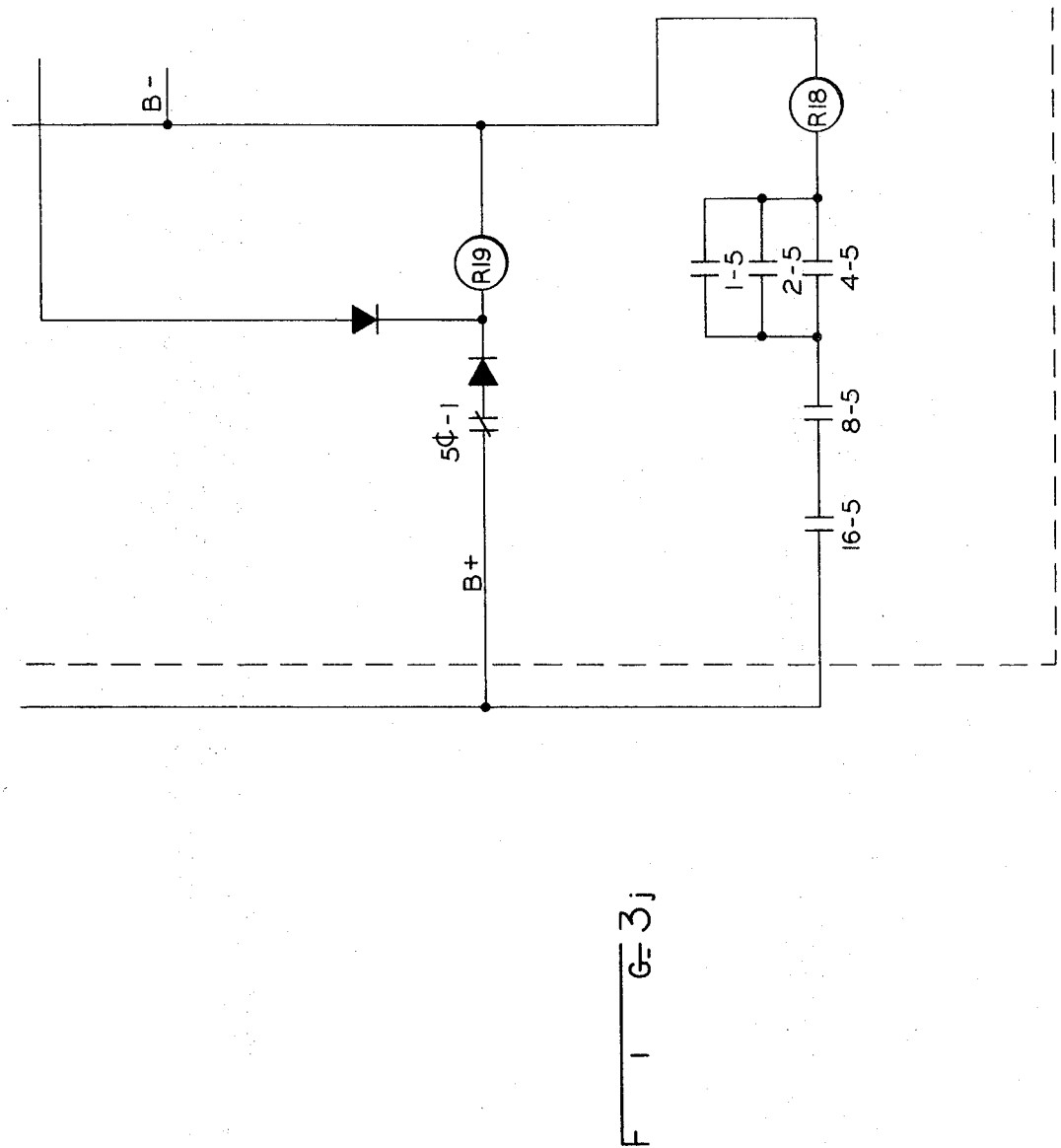

With reference to FIGS. 3a through 3i, we have shown a complete schematic diagram of our control and change making device. Because of its relatively large size and complexity, the diagram had to be placed on a number of sheets, which should be arranged in the manner indicated in FIG. 4 so that the circuit elements and leads on each sheet can be considered connected to circuit elements and leads on other sheets. Our control and change making circuit is provided with a suitable source of electrical voltage, such as 115 volts, 60-cycle alternating current. This alternating current is used for many of the circuit functions, but direct current is also required. The direct current is supplied by a transformer T1 whose secondary is connected to a full wave bridge rectifier 50. The output of the rectifier 50 is filtered by a suitable filter capacitor C1 to provide positive direct current voltage B+ on a positive bus 51, and negative direct current voltage B− on a negative bus 52. Our control and change making circuit utilizes a plurality of relays, designated by the letter R followed by a number. The relays have a number of associated contacts which are designated by the relay number followed by a dash and another number indicating the particular contact number. The relays used in the control and change making circuit are as follows:

| Relay No.: | Description | Contact Nos. |
|---|---|---|
| R1 | Out of change | 4 |
| R2 | Regular (premium lockout) | 1, 3, 4 |
| R3 | Premium (regular lockout) | 1, 2, 3, 4 |
| R4 | Buffer for R19, slow dispense | 1, 2, 3, 4 |
| R5 | Handle switch operated | 2, 3, 4 |
| R6 | Buffer for R17, fast dispense | 4 |
| R7 | Add one dollar | 4 |
| R9 | Dispense count relay | 4 |
| R10 | Change circuit operating | 1, 3, 4 |
| R11 | Pulse relay (for out-of-change light) | 3, 4 |
| R12 | Product delivered | 1, 2, 3 |
| R13 | Change operate | 1, 2, 3 |
| R14 | Even nickel operate | 1, 2, 4 |
| R15 | Even quarter operate | 2, 1, 4 |
| R16 | Pulse relay (for change) | 1, 4 |
| R17 | Solenoid control, fast | 1, 2 |
| R18 | Limit lockout for maximum deposit | 1 |
| R19 | Solenoid control, slow | 1, 2 |
| R21 | 1¢ transfer | 1, 4 |
| R22 | 5¢ transfer | 1, 4 |
| R23 | 25¢ transfer | 1, 4 |
| R24 | Add 50¢ | 1 |
| R25 | Add 25¢ | 1 |

FIGS. 3a through 3i, the relay contacts are shown in their position when their respective relay winding is deenergized. Thus, for example, the relay contacts R2-1 are open when the relay R2 is deenergized, and the relay contacts R2-4 are closed when the relay R2 is deenergized. When the relay R2 is energized, the contacts R2-1 close, and the contacts R2-4 open.

Our control and change making circuit utilizes two free running or astable multivibrators 53, 54. We prefer to use two multivibrators, since they have different functions that are not necessarily required at the same time. However, with appropriate modifications, one multivibrator could suffice. The multivibrator 53 comprises two NPN transistors Q2, Q3 connected in free running fashion and connected to an output or driver transistor Q1, also an NPN type. Similarly, the multivibrator 54 comprises two NPN transistors Q4 and Q5 connected in astable or free running fashion and connected to an output or driver transistor Q6, also an NPN type. We have found that the multivibrators preferably operate or produce output pulses at the rate of around 60 pulses per minute, or 1 pulse per second. However, as will be appreciated, other rates of operation may also be utilized.

The accumulator 40 comprises a number of flip-flops, which may be either all electronic, or which may use electromagnetic relays. These flip-flops have a set input terminal S, a reset input terminal R, and a supply terminal L. Each of the upper flip-flops FF1 through FF16 have an output terminal 0 which produces a positive voltage or signal whenever the respective flip-flop is in the set condition. The flip-flops have various associated contacts indicated by the flip-flop number followed by a hyphen, and followed by a contact number. These contacts are either opened or closed, depending upon the set or reset condition of the flip-flop. The contacts are shown in their condition when a flip-flop is reset. Thus, with respect to the flip-flop FF1, the contacts 1-1 and 1-2 are closed and the contacts 1-3 and 1-4 are open when the flip-flop FF1 is reset. When the flip-flop FF1 is set, the contacts 1-1 and 1-2 open, and the contacts 1-3 and 1-4 close.

The detailed operation of our control and change making circuit shown in FIGS. 3a through 3i will be discussed in three parts. The first part will explain the manual operation, the second part will explain the automatic and change making operation, and the third part will give examples of the automatic and change making operation.

Manual Operation

With reference to FIG. 1 as well as FIGS. 3a through 3i, we have assumed that a filling station operator is on duty, and that he is able to dispense gasoline to customers and receive payment for the gasoline. In such a situation, the operator places the switch 20 on the housing 10 in the manual position. The switch could be installed in a remote location if desired. This connects one side of the 115 volt source directly to the necessary circuit elements so that either the regular pump 11 or the premium pump 12 can be used. For example, assume that the customer wishes to purchase regular gasoline. When the operator is ready to dispense the gasoline, he removes the nozzle 31 and operates switch 32. With reference to FIGS. 3a through 3i, this causes the handle switch 32 to close its three contacts. The upper contacts energize the regular dispenser motor and pump 24, and the middle contacts energize the regular dispenser solenoid 28 to that gasoline can be dispensed at a rapid rate. The lower contacts of the switch 32 are not energized, since the slow dispensing solenoid 34 is not needed for manual operation. Similarly, if gasoline is to be dispensed from the premium pump 12, the operator can remove the nozzle 31' and operate the handle switch 32'. This energizes the premium dispenser motor and pump 24' through the upper contacts of the switch 32', and energizes the premium dispenser solenoid 28 through the center contacts of switch 32'. Thus, premium gasoline can be dispensed as rapidly as desired.

It will be seen that in manual operation, our control and change making circuit is not utilized. However, our control and change making circuit is compatible with a plurality of dispensers, and permits the dispensers to be used in the conventional fashion, either individually or together.

Automatic Operation

If it is desired to use the control and change making device in accordance with our invention, then the operator can operate the switch 20 to the automatic position, as shown in FIG. 1 and FIGS. 3a through 3i. The switch 20 is shown in its automatic position, and this permits the device of our invention to be used by a customer who can deposit money, dispense his own gasoline, and receive change if such change is due. With the switch 20 in the automatic position, assume that a customer wishes to deposit money and dispense gasoline, for example regular gasoline. It has been assumed that quarters, half dollars, and 1 dollar bills can be deposited for purchase. With the circuit in operation, a capacitor C2 is charged from the positive bus 51 through the 25 cent add or deposit switch to the negative bus 52. Likewise, a capacitor C3 is charged from the positive bus 51 through the 50 cent add or deposit switch to the negative bus 52. And, a capacitor C4 is charged from the positive bus 51 through the closed relay contacts R7–4 to the negative bus 52. Each time that a quarter is deposited, the 25 cent switch is moved downward and the capacitor C2 discharges through the 25 cent relay R25. This causes the contacts R25–1 to close and supply a positive pulse through the contacts 1–1 to the set input terminal S of the flip-flop FF1. Likewise, when a half dollar is deposited, the capacitor C3 discharges through the 50 cent relay R24. This closes the contacts R24–1 to supply a positive pulse through the contacts 2–1 to the set input terminal of the flip-flop FF2. And when a dollar bill is deposited, the relay R7 is energized to discharge the capacitor C4 through the upper contacts R7–4 and supply a positive pulse through the contacts 4–1 to the set input terminal S of the flip-flop FF4. Thus, a deposit of 25 cents causes the flip-flop FF1 to become set, a deposit of 50 cents causes the flip-flop FF2 to become set, and a deposit of 1 dollar causes the flip-flop FF4 to become set. Persons skilled in the art will appreciate that if a previous deposit has been made, a subsequent deposit may cause a flip-flop to be reset and another flip-flop to be set. The capacitors C2, C3, and C4 allow only 1 pulse per switch closure to be produced, thus eliminating the possibility that continuous credit would be provided if one of the switches were to remain closed for some reason.

However, because of the storage capacity of the flip-flops FF1 through FF16, we place a limit on the amount that can be deposited. This limit is set by the flip-flop contacts 16–5 and 8–5 connected in series, and by one of the three flip-flop contacts 1–5, 2–5, or 4–5 connected in parallel with each other and in series with the contacts 16–5 and 8–5 and the relay R18. When the flip-flops FF16 and FF8 are set, representing a deposit of 6 dollars, then if any one of the flip-flops FF1, FF2, or FF4 become set (representing either 25 cents, 50 cents, or 1 dollar), then the relay R18 becomes energized. When the relay R18 is energized, its contacts R18–1 open and deenergize the 1 dollar, 50 cents, and 25 cent relays or solenoids, and also deenergizes the deposit light 15. When the light 15 is extinguished, a customer is warned that he should deposit no more money. However, if the customer does deposit more money, deenergization of the 1 dollar, 50 cent, and 25 cent relays or solenoids can operate appropriate devices so that any money deposited will be returned. Also in series with the contacts R18–1 are the contacts R5–4. The relay R5 is energized if either of the handle switches 32, 32' is energized so that deposit may not be made if one of the handle switches 32, 32' is operated. The contacts R10–1 will be opened if the change circuit operating relay R10 is energized. Thus, if the change circuit is dispensing change back to a customer, deposits may not be made, since such deposits would disrupt the change circuit operation.

When a deposit is received, one of the flip-flops FF1 through FF16 causes its output terminal 0 to become positive and energize the relay R17, and also energize the relay R19. As will be explained, the relay R17 remains energized until only 5 cents credit remains in the accumulator. When the credit is reduced to 5 cents by dispensing gasoline, the relay R17 becomes deenergized. Then, only the relay R19 remains energized so that dispensing takes place at a slower rate.

Assuming that a deposit has been made, then a customer may proceed to dispense gasoline. If the customer wishes regular gasoline, he can remove the regular nozzle 31 and operate switch 32 to cause its three contacts to close. The upper contact energizes the regular dispenser motor and pump 24. This upper contact also energizes the regular relay R2 through the contacts R3–1. With the relay R2 energized, its contacts R2–4 open so that the premium relay R3 can not be energized. Voltage from the lower contacts of the switch 20 is supplied through the now closed contacts R6–4. The relay R6 was energized by the contacts R17–1 closing when the relay R17 was energized. This voltage is applied through the closed contacts R10–3 and the closed left-hand contacts R3–2 to energize the middle contacts of the switch 32. This permits the regular solenoid 28 to be operated to that gasoline may be dispensed at a rapid rate. This same voltage from the lower contacts of the switch 20 is applied through the contacts R4–1 which are closed by energization of the relay R4. The relay R4 is energized by the contacts R19–1 which are closed by energization of the relay R19. This voltage is supplied through the closed contacts R10–4 and the upper contacts R3–3 to the lower terminal of the handle switch 32 so that the solenoid 34 is also energized. Thus, with reference to FIG. 1, both solenoid valves 28, 34 are energized and opened so that dispensing of regular gasoline can take place as rapidly as the customer desires. Also, the relay R5 is energized through the contacts R2–1.

However, if the customer wishes to dispense premium gasoline, then he would remove the premium nozzle 31' and would operate the premium handle switch 32'. the upper contacts of the switch 32' would energize the premium dispenser motor and pump 24'. These upper contacts would also energize the premium relay R3 through the contacts R2–4. With the relay R3 energized, its contacts R3–1 open so that the regular relay R2 can not be energized. The contacts R3–2 switch so that the right-hand contact is closed to energize the middle contacts of the switch 32; and the contacts R3–3 are operated so that the lower contacts R3–3 are closed to energize the lower contacts of the switch 32'. Thus, the premium fast solenoid 28' and the premium slow solenoid 34' are energized. Also, the relay R5 is energized through the contacts R3–1.

As previously mentioned, if at least 5 cents remains stored in the flip-flops FF1 through FF16, the relay R17 is energized, and this energizes its buffer relay R6. With the relay R6 energized, its contacts R6-4 are closed so that gasoline may be dispensed from the regular pump 11 or the premium pump 12 at a rapid rate. Also, if any information remains stored in the flip-flops FF1 through FF16, the relay R19 remains energized. This causes its contacts R19-1 to close and energize the buffer relay R4. With the relay R4 energized, its contacts R4-1 supply voltage to either the lower contact of the handle switch 32 or the lower contact of the handle switch 32' to energize the slow solenoid 34 or the slow solenoid 34'.

As gasoline is dispensed from the regular pump 11, the regular meter and associated readout device causes the switch 25 to close once for each 1 cent of regular gasoline dispensed. As gasoline is dispensed from the premium pump 12, the premium meter and associated readout device causes the switch 25' to close once for each 1 cent of premium gasoline dispensed. Depending upon whether regular or premium gasoline is dispensed, the relay contacts R2-3 will be operated so that one of the two switches 25, 25' will energize the relay R9. The relay R9 has a set of associated contacts R9-4 connected at the positive bus 51 to produce positive dispense pulses through the closed contacts R4-4 (as long as the relay R4 and the relay R19 are energized) and through the normally closed contacts R13-3 (closed unless the change operate relay R13 is energized) to the 1 cent data bus. This 1 cent data bus is connected through relay contacts R19-2 and the contacts 4¢ -1 to the flip-flop FF1¢. Thus, for each 1 cent of gasoline dispensed, a pulse or information signal is applied to the flip-flop FF1¢.

The flip-flops FFA, FF1¢, FF2¢, FF4¢, FF5¢, FF10¢, and FF20¢ are connected as a delay and counter so as to produce a pulse for each 5 cents counted, and also for each 25 cents counted. The flip-flops are arranged so that at the beginning of a cycle of operation, the flip-flops FFA, FF1¢, FF2¢, FF4¢, FF10¢, and FF20¢ are in the reset condition, and so that the flip-flop FF5¢ is in the set condition. This is indicated by the reset button circuit which is connected to the reset input terminal R for all flip-flops but the flip-flop FF5¢. Set out below is a truth table indicating the conditions of the flip-flops at the start, and for 25 input pulses at the relay contacts R19-2. In this table, a 0 indicates that the flip-flop is reset, and a 1 indicates that the flip-flop is set. A 5 cent data pulse is produced on the 5 cent data bus at the 5th pulse, the 10th pulse, the 15th pulse, the 20th pulse, and the 25th pulse. At the 25th pulse, the condition is the same as it was at the start, and the cycle is repeated. Also, a 25 cent pulse is produced for supplying to the accumulator flip-flop FF1 at the 20th pulse, and a 25 cent data pulse is produced on the 25 cent data bus at the 25th pulse.

the end of 20 pulses, and each 25 pulses thereafter. Also, the counter flip-flops FF1¢ through FF20¢ produce a 5 cent pulse at the end of each 5 input pulses.

If a customer has dispensed at least 5 cents worth of gasoline, then one pulse will have been produced on the 5 cent data bus. This pulse is coupled through the diode D3 to the product delivered relay R12. This pulse is sufficiently long to energize the relay R12 through the now closed contacts R4-3 connected to the negative bus 52. This momentary energization of the relay R12 closes its contacts R12-1 so that it becomes sealed in until the contacts R4-3 open again. This arrangement is desirable so that customers will not use our device simply as a means of obtaining change, but requires the customer to insert money and actually dispense gasoline (any suitable amount) before they can get change. Before the customer can get change, he must replace the nozzles 31, 31' so that the handle switches 32, 32' are in the off position. This deenergizes the relay R5 so that its contacts R5-3 can close. If gasoline has been dispensed, the change due light 17 will be illuminated, to indicate to the customer that he must obtain his change. The change due light 17 is illuminated through the now closed contacts R12-3, the now closed contacts R5-2, and the intermittently closing contacts R11-3. The contacts R11-3 operate intermittently because the multivibrator 53 is energized from the positive bus 51, connected to the transistors Q1, Q2, Q3, through the diode D2, through the now closed contacts R5-3, through the now closed contacts R4-2, and through the three serially connected out-of-change switches labeled 1 cent, 5 cents, and 25 cents to the negative bus 52. These out-of-change switches are normally closed unless, as will be explained, there is sufficient change left in our device. This causes the relay R11 to be intermittently energized, and thus causes its associated contacts to be intermittently opened and closed. Hence, the change due light 17 flashes on and off to tell the customer that he should obtain his change. In order to obtain change, there must, as pointed out above, be change in the device as indicated by the out-of-change switches being closed. This applies the negative bus 52 to the start line. The relay R4 must be energized by its relay R19 and contacts R19-1, a condition that will take place only if credit remains in the accumulator. Thus, the negative bus is connected to the contacts R5-3. In order to obtain change, the customer momentarily depresses the change switch 19 to connect the negative bus to the now closed contacts R12-2. This permits the positive bus 51 to be connected through the relay R13 to the negative bus and energizes the relay R13. The relay R13 seals in through its contacts R13-1 which are connected through the now closed contacts R4-3 to the negative bus 52 so that the relay R13 remains energized after the change button 19 is released.

|  | FF 1¢ | FF 2¢ | FF 4¢ | FF 5¢ | FF 10¢ | FF 20¢ | FFA | Function |
|---|---|---|---|---|---|---|---|---|
| Pulse: | | | | | | | | |
| Start | 0 | 0 | 0 | 1 | 0 | 0 | 0 | |
| 1 | 1 | 0 | 0 | 1 | 0 | 0 | 0 | |
| 2 | 0 | 1 | 0 | 1 | 0 | 0 | 0 | |
| 3 | 1 | 1 | 0 | 1 | 0 | 0 | 0 | |
| 4 | 0 | 0 | 1 | 1 | 0 | 0 | 0 | |
| 5 | 0 | 0 | 0 | 0 | 1 | 0 | 0 | 5¢ data pulse.[1] |
| 6 | 1 | 0 | 0 | 0 | 1 | 0 | 0 | |
| 7 | 0 | 1 | 0 | 0 | 1 | 0 | 0 | |
| 8 | 1 | 1 | 0 | 0 | 1 | 0 | 0 | |
| 9 | 0 | 0 | 1 | 0 | 1 | 0 | 0 | |
| 10 | 0 | 0 | 0 | 1 | 1 | 0 | 0 | 5¢ data pulse.[1] |
| 11 | 1 | 0 | 0 | 1 | 1 | 0 | 0 | |
| 12 | 0 | 1 | 0 | 1 | 1 | 0 | 0 | |
| 13 | 1 | 1 | 0 | 1 | 1 | 0 | 0 | |
| 14 | 0 | 0 | 1 | 1 | 1 | 0 | 0 | |
| 15 | 0 | 0 | 0 | 0 | 0 | 1 | 0 | 5¢ data pulse.[1] |
| 16 | 1 | 0 | 0 | 0 | 0 | 1 | 0 | |
| 17 | 0 | 1 | 0 | 0 | 0 | 1 | 0 | |
| 18 | 1 | 1 | 0 | 0 | 0 | 1 | 0 | |
| 19 | 0 | 0 | 1 | 0 | 0 | 1 | 0 | |
| 20 | 0 | 0 | 0 | 0 | 0 | 0 | 1 | {5¢ data pulse.[1] / 25¢ pulse to accumulator.[2]} |
| 21 | 1 | 0 | 0 | 0 | 0 | 0 | 1 | |
| 22 | 0 | 1 | 0 | 0 | 0 | 0 | 1 | |
| 23 | 1 | 1 | 0 | 0 | 0 | 0 | 1 | |
| 24 | 0 | 0 | 1 | 0 | 0 | 0 | 1 | |
| 25 | 0 | 0 | 0 | 1 | 0 | 0 | 0 | {5¢ data pulse.[1] / 25¢ data pulse.[1]} |

[1] These pulses are used only in giving change.
[2] This pulse is used in dispensing and giving change.

Thus, the counter flip-flops FF1¢ through FF20¢ produce a 25 cent countdown pulse to the accumulator flip-flop FF1 at When the relay R13 is energized, the change making process is initiated and continues until no credit remains in the accumulator. With the contacts R13-1 energized, the multivibrator 54 is also energized so that the driver transistor Q6 causes the relay R16 to be intermittently energized at the selected rate. This causes a positive voltage to be supplied through the now closed contacts R13-2 and the operating contacts R16-1 to supply change pulses. This also supplies steady voltage to the relay R10 to energize this relay. Its associated contacts R10-4 are open so that the receive solenoids for 25 cents, 50 cents and 1 dollar are open and no money can be deposited. Also, its contacts R10-3 are opened so that the center contacts of the handle switches 32, 32' can not be energized, and opens the contacts R10-4 so that the lower contacts of the handle switches 32, 32' can not be energized.

With the relay R13 energized, its associated contacts R13-3 open so that dispensing pulses, produced by the relay R9, can not be supplied, thus eliminating the possibility of some count from the dispenser switches during the change operation.

The associated contacts R16-4 produce countdown pulses to the contacts R14-4, and in the normal condition of these contacts R14-4, pulses are supplied over the 1 cent data bus to the contacts R19-2. At the same time, change pulses are supplied by the contacts R16-1 through the normal condition of the contacts R14-2 to operate the 1 cent solenoid. Thus, for each pulse produced by operation of the relay R16, a 1 cent signal is supplied to the counter flip-flops FF1¢ through FF20¢, and is supplied to the 1 cent solenoid. When the 1 cent solenoid is operated, it returns 1 cent in change. This continues until an even 5 cents is registered in the flip-flops FF1¢ through FF20¢. As indicated, at the fifth pulse for example, a 5 cent data pulse is produced at this time, and this pulse is supplied through the diode D4 to the relay R14. When the relay R14 is energized, its contacts R14-1 seal in and its contacts R14-2 switch so that the change pulses are now supplied to the contacts R15-2. Under the normal condition of these contacts R15-2, pulses are now supplied to the 5 cent solenoid to dispense nickels in change to the customer. Similarly, the contacts R14-4 operate and the countdown pulses are now supplied through the normally closed contacts R15-4 to the 5 cent data bus. This 5 cent data bus then causes the flip-flops FF5¢, FF10¢, and FF20¢ to operate in increments of 5 cents.

When the counter flip-flops FF5¢ through FF20¢ reach an even increment of 25 cents, a 25 cent data signal is produced through the contacts A-1 of the flip-flop FFA on the 25 cent data bus. This pulse is supplied through the diode D5 to energize the relay R15. The relay R15 is sealed in through its contacts R15-1. This causes the contacts R15-2 to operate so that the change pulses are now supplied to the 25 cent solenoid to change or return change of 25 cents to the customer. Similarly, the contacts R15-4 operate so that the countdown pulses are supplied through the diode D6 to the 25 cent countdown bus to the flip-flop FF1. Thus, the flip-flop FF1 receives 25 cent countdown pulses in synchronism with returning of 25 cents in change for each pulse.

In part summary, it will be seen that after gasoline is dispensed, pulses representing 1 cent are supplied to the counter flip-flops FF1¢ through FF20¢ until an even nickel has been reached. For each of these pulses, 1 cent in change is returned to the customer. Then, when an even nickel condition is reached, the pulses are switched to the flip-flops FF1¢ through FF20¢ so that they have a significance of 5 cents, and for each such pulse 5 cents in change is returned to the customer. In addition, the relay which is operated to cause the pulse to have a significance of 5 cents change prevents any more pennies from being returned. Then, when a total of 25 cents was reached, relays were operated so that each pulse had a significance of 25 cents and returned 25 cents in change to the customer. Similar contacts prevented any nickels from being returned to the customer.

As mentioned earlier, all of the counter flip-flops are started in their reset condition except the flip-flop FF5¢ which is started in the set condition. This puts an advance count of 5 cents into the counters, with the result that a 25 cent countdown pulse is produced by the counter flip-flops after only 20 cents in data pulses have been supplied to them. When a customer is dispensing, if the customer dispenses all of the gasoline represented by his deposit, it is desirable that the last small amount of gasoline be dispensed at a slow rate. We have selected the last 5 cents worth of gasoline as being the point at which slow dispensing takes place. Thus, when actually the customer is entitled to receive 5 cents more of gasoline, all of the flip-flops FF1 through FF16 become reset. This deenergizes the relay R17, so that the relay R6 becomes deenergized. With the relay R6 deenergized, its contacts R6-4 open so that no voltage can be supplied to either the middle contacts of the regular handle switch 32 or to the middle contacts of the premium handle switch 32'. For this reason, the fast dispensing solenoids 28, 28' are deenergized so that the large lines are closed, and gasoline can only be dispensed through the small lines 33, 33' (as shown in FIG. 1). However, the relay R19 remains energized through the contacts 5¢-1, since the flip-flop FF5¢ is reset between the twentieth and 24 pulses, as shown in the truth table. However, when the 25 pulse is received, this causes the flip-flop FF5¢ to become set and opens the contacts 5¢-1. The relay R19 is deenergized, and the contact R19-1 opens to deenergized the relay R4. This opens the contacts R4-1 so that neither of the lower contacts of the handle switches 32, 32' can receive a voltage, and thus the slow dispensing solenoids 34, 34' are opened. Since these solenoids are in a relatively small line 33, 33' respectively, the cut off of gasoline is quick and accurate, and gives the customer exactly what he paid for.

If the change device has been used, the flip-flops FF1 through FF16 count down in the same manner as if gasoline were dispensed, the only difference being that the pulses are supplied by the relay contacts R16-4. Once the flip-flops are counted down to their normal start condition, the relay R17 and the relay R19 are deenergized, and this deenergizes the relays R4 and R6 to stop further change operation. When the relay R4 is deenergized, its contacts R4-3 open and remove the negative bus 52 from the relays R13, R16, the multivibrator 54, the relay R12, the relay R14, the relay R12, the relay R15, the 1 cent, 5 cent, and 25 cent transfer switches (which will be explained), and their associated relays R21, R22, R23. Thus, our device is returned to its normal condition where it can receive a new deposit.

It will be noticed that there are two 1 cent solenoids, two 5 cent solenoids, and two 25 cent solenoids. These solenoids are provided to switch available change for a given denomination from one bank of change to a second bank of change for that denomination. If, during changing, one of the change banks, for example the number one bank of the 25 cent coins, reaches a minimum limit, the 25 cent transfer switch opens. However, its relay R23 was previously energized so that it remains sealed in around the 25 cent transfer switch through the contacts R23-1. Thus, the transfer circuit does not operate during a changing operation. However, after a changing operation has taken place, the relays R21, R22, R23, are deenergized. If any one of their respective transfer switches has operated, that particular relay remains deenergized even after the change circuit is operated again by closure of the contacts R4-3. Hence, that particular associated set of contacts, for example the contacts R23-4, switch so that the number two solenoid for that bank of coins will be operated. Thus, the capacity of the change banks can be doubled, or with appropriate circuits, can be increased more.

If the amount of change in the banks falls below a selected level, the appropriate one of the out-of-change switches will operate. This removes the start line from the negative bus 52, and connects the negative bus 52 directly to the relay R1 and to the multivibrator 53. This causes the out-of-change relay R11 to be intermittently energized, and the relay R1 to be steadily energized. The contacts R1-4 close and the contacts R11-4 intermittently close to intermittently illuminate the out-of-change light 14 indicating that change is needed in the device. If this occurs during a changing operation, the change circuit including the relays R10, R13, and R16 and the multivibrator 54 continue to operate since the negative bus 52 is supplied to this circuit through the contacts R4-3. Any inaccuracy or error can be eliminated by arranging the out-of-change switches to operate before all of the change is exhausted. That is, the out-of-change switches can be arranged so that they operate when there is sufficient change still remaining to supply the customer with whatever change he may require.

Examples of Automatic Operation

To assist in understanding the operation of our device, we have provided several examples of operation of our device, we have provided several examples of operation. In the first example, it is assumed that a customer deposits 5 dollars in appropriate coin receiving slots. It is also assumed that the customer's gasoline tank will hold all of the gasoline represented by that deposit. With a deposit of 5 dollars, the flip-flop FF16 and the flip-flop FF4 are set. The customer operates the selected one of the handle switches 32, 32', and begins to dispense his gasoline. As he does so, pulses are provided by the contacts R9-4 to the 1 cent data bus. It will be recalled that in the counter flip-flops, all flip-flops are reset except the flip-flop FF5 which is set. After 20 pulses representing 20 cents have been received, a 25 cent countdown pulse is produced. This pulse is supplied to the flip-flops FF1 through FF16 to reduce the amount of information stored. Similar pulses are received for each 25 cents in 1 cent data pulses received thereafter, such as at 45 cents, 70 cents, 95 cents, and so on. During this time, at least one of the flip-flops FF1 through FF16 is set, so that the relay R17 remains energized and dispensing takes place at a rapid rate. However, when pulses representing a total of $4.95 have been received, a 25 cent data pulse is applied to the flip-flops FF1 through FF16 to reset all of these flip-flops. This deenergizes the relay R17 so that only dispensing at a slow rate may take place. At this point, the customer is still entitled to 5 cents more in gasoline. At this time, the flip-flop FF5¢is reset so that its contacts 5¢-1 are closed and the relay R19 is energized. This permits dispensing at a slow rate. The 1 cent pulses are received, and when the last 1 cent pulse representing a total of 5 dollars has completed its duration, the flip-flop FF5¢becomes set. This opens the contacts 5¢-1 and deenergizes the relay R19, which in turn deenergizes the relay R4. With the relay R4 deenergized, the slow solenoid 34 or 34' is deenergized, and delivery of gasoline stops. This stopping is precise and accurate because of the small line size mentioned. When delivery of the gasoline stops, no further pulses are produced, so that the flip-flops FF1 through FF16 are reset, and in the counter, all flip-flops but flip-flop FF5¢are reset. The flip-flop FF5¢is the only flip-flop that is set. Thus, the accumulator is restored to its initial start condition for further receipt of money and dispensing.

In the second example, it is again assumed that the customer deposits 5 dollars but that his tank will hold only $4.27 worth of gasoline. Assuming that the customer has dispensed $4.27 worth of gasoline, then the flip-flops FF1 and FF2 are set, but that the flip-flops FF4, FF8 and FF16 are reset. In the counter flip-flops, $4.25 of pulses restores the flip-flops to their initial condition with only the flip-flop FF5¢set. Thus, $4.27 causes the flip-flops FF5¢and FF2¢to be set. At this point, the contacts 5¢-1 are open, but the relays R17 and R19 are energized by one of the flip-flops FF1 or FF2. Then, the customer pushes the start for change button 19. This will begin the change circuit, since the relay R12 was previously energized by a 5 cent data pulse indicating that at least 5 cents worth of fuel has been dispensed. The relay R16 begins operation and produces change pulses at its contacts R16-1 and countdown pulses at its contacts R16-4. After three countdown pulses representing three cents in change had been produced, the flip-flop FF10¢ is set and a 5 cent data pulse is produced to indicate that nickels may be given in change. This 5 cent data pulse energizes the relay R14 so that pulses now represent 5 cents. After three pulses representing 15 cents in additional change, the flip-flop FF20¢ is reset and the flip-flop FFA is set. This produces a 25 cent countdown pulse to reset the flip-flop FF1 and leave only the flip-flop FF2 in a set condition. After another pulse representing an additional 5 cents, the flip-flop FF5¢ is set and a 25 cent data pulse is produced through the contacts A-1 to indicate that quarters may be given in change. At this point, it will be noted that 3 cents in change has been given, and 4 nickels or 20 cents in change has been given, or a total of 23 cents in change. At this point, the 25 cent data pulse causes the relay R15 to become energized so that the pulses now represent 25 cents. No pulses go to the counter flip-flops after this point. With the flip-flop FF5¢ set, the contacts 5¢-1 are open, but relays R17 and R19 are both energized. However, this has no significance at this point since the customer is not dispensing. After one pulse representing 25 cents in change is produced, the flip-flop FF1 becomes set and the flip-flop FF2 becomes reset. Then, after another pulse representing 25 cents in change is produced, the flip-flop FF1 is reset. At this point, a total amount of 73 cents (represented by two quarters, four nickels, and three pennies) has been returned to the customer. All the flip-flops FF1 through FF16 are reset, so that the relay R19 and the relay R17 are deenergized. With the relay R19 deenergized, the relay R4 becomes deenergized so that its contacts R4-3 stop the pulse circuit and stop the changing operation. At this point, the flip-flops are all reset, except for the flip-flop FF5¢, which is set. Hence, the accumulator is ready for a new cycle of operation.

Conclusion

It will thus be seen that our invention provides a new and improved control and change making device for gasoline dispensing pumps and similar arrangements. While we have shown only one embodiment of our invention, persons skilled in the art will appreciate that modifications may be made. For example, various types of flip-flops may be used, and any number of banks of coins may be stored for each denomination of change. Various sizes of supply lines may be used, depending upon preference and desired rates of flow during high speed flow and during the low speed flow near cutoff. While our accumulator can be used with a plurality of gasoline dispensing pumps, it may also be used with only one pump. If another accumulator is provided with similar interconnecting circuits in the housing 10 of FIG. 1, simultaneous operation of two dispensing pumps may be provided. Therefore, while our invention has been described with reference to a particular embodiment, it is to be understood that modifications may be made without departing from the spirit of the invention or from the scope of the claims.

We claim:

1. For use with a fluid dispensing pump having means for producing pulses as a function of the monetary amount of fluid dispensed by said pump, an improved control device comprising:
   a. means for receiving money and producing information signals as a function of the amount of money received;
   b. an accumulator having an input and an output;
   c. means coupling said money receiving means to said accumulator input for storing information signals as a function of the money received by said receiving means;
   d. a money counter having an input and at least one output, said money counter input being adapted to be coupled to said pulse producing means of a dispensing pump;
   e. a selectively operable pulse circuit coupled to said money counter input;
   f. and means coupling said money counter output to said accumulator input to reduce the information signals stored in said accumulator as a function of pulses supplied to said money counter input.

2. The improved control device of claim 1, wherein said accumulator is an electronic digital accumulator, and further comprising means coupled to said accumulator output and adapted to be coupled to said fluid dispensing pump means for stopping said fluid dispensing pump means in response to said accumulator having no nonzero information signals stored therein.

3. The improved control device of claim 1, wherein said accumulator is an electronic digital accumulator, and further comprising means coupled to said accumulator and adapted to be coupled to said fluid dispensing pump means for stopping said fluid dispensing pump means in response to said accumulator having no nonzero information signals stored therein, and means coupled to said accumulator output and coupled to said money receiving means for limiting the amount of money received by said money receiving means to the information signal storage capacity of said accumulator.

4. The improved control device of claim 1, wherein said accumulator is an electronic digital accumulator, and further comprising means coupled to said accumulator output and adapted to be coupled to said fluid dispensing pump means for stopping said fluid dispensing pump means in response to said accumulator having no nonzero information signals stored therein, and a change circuit coupled to said pulse circuit for dispensing money change in response to pulses producing by said pulse circuit.

5. The improved control device of claim 1, wherein said accumulator is an electronic digital accumulator, and further comprising means coupled to said accumulator output and adapted to be coupled to said fluid dispensing pump means for stopping said fluid dispensing pump means in response to said accumulator having no nonzero information signals stored therein, and flow control means coupled to said accumulator output and adapted to be coupled to a fluid dispensing pump for reducing the rate of fluid dispensed by said fluid dispensing pump in response to the amount of information signals in said accumulator being reduced to a selected magnitude.

6. The improved control device of claim 1, wherein said accumulator is an electronic digital accumulator, and further comprising means coupled to said accumulator output and adapted to be coupled to said fluid dispensing pump means for stopping said fluid dispensing pump means in response to said accumulator having no nonzero information signals stored therein, and means coupled between said money counter and said pulse circuit for rendering said pulse circuit inoperative until a selected number of pulses have been received at said money counter input from said pulse producing means of a pump.

7. The improved control device of claim 1, wherein said accumulator is an electronic digital accumulator, and further comprising means coupled to said accumulator output and coupled to said money receiving means for limiting the amount of money received by said money receiving means to the information signal storage capacity of said accumulator.

8. The improved control device of claim 1, wherein said accumulator is an electronic digital accumulator, and further comprising a change circuit coupled to said pulse circuit for dispensing money change in response to pulses produced by said pulse circuit.

9. The improved control device of claim 1, wherein said accumulator is an electronic digital accumulator, and further comprising a change circuit coupled to said pulse circuit for dispensing money change in response to pulses produced by said pulse circuit, and flow control means coupled to said accumulator output and adapted to be coupled to a fluid dispensing pump for reducing the rate of fluid dispensed by said fluid dispensing pump in response to the amount of information signals in said accumulator being reduced to a selected magnitude.

10. The improved control device of claim 1, and further comprising a change circuit coupled to said pulse circuit for dispensing money change in response to pulses produced by said pulse circuit, and means coupled between said money counter and said pulse circuit for rendering said pulse circuit inoperative until a selected number of pulses have been received at said money counter input from said pulse producing means of a pump.

11. The improved control device of claim 1, wherein said accumulator is an electronic digital accumulator, and further comprising flow control means coupled to said accumulator output and adapted to be coupled to a fluid dispensing pump for reducing the rate of fluid dispensed by said fluid dispensing pump in response to the amount of information signals in said accumulator being reduced to a selected magnitude.

12. The improved control device of claim 1, and further comprising flow control means coupled to said accumulator output and adapted to be coupled to a fluid dispensing pump for reducing the rate of fluid dispensed by said fluid dispensing pump in response to the amount of information signals in said accumulator being reduced to a selected magnitude, and means coupled between said money counter and said pulse circuit for rendering said pulse circuit inoperative until a selected number of pulses have been received at said money counter input from said pulse producing means of a pump.

13. The improved control device of claim 1, and further comprising means coupled between said money counter and said pulse circuit for rendering said pulse circuit inoperative until a selected number of pulses have been received at said money counter input from said pulse producing means of a pump.

14. The improved control device of claim 1, wherein said accumulator is an electronic digital accumulator, and further comprising means coupled to said accumulator output and adapted to be coupled to said fluid dispensing pump means for stopping said fluid dispensing means in response to said accumulator having no nonzero information signals stored therein, a change circuit coupled to said pulse circuit for dispensing money change in response to pulses produced by said pulse circuit, and flow control means coupled to said accumulator output and adapted to be coupled to a fluid dispensing pump for reducing the rate of fluid dispensed by said fluid dispensing pump in response to the amount of information signals in said accumulator being reduced to a selected magnitude.

15. The improved control device of claim 1, and further comprising means coupled to said accumulator output and adapted to be coupled to said fluid dispensing pump means for stopping said fluid dispensing pump means in response to said accumulator having no information signals stored therein, flow control means coupled to said accumulator output and adapted to be coupled to a fluid dispensing pump for reducing the rate of fluid dispensed by said fluid dispensing pump in response to the amount of information signals in said accumulator being reduced to a selected magnitude, and means coupled between said money counter and said pulse circuit for rendering said pulse circuit inoperative until a selected number of pulses have been received at said money counter input from said pulse producing means of a pump.

16. The improved control device of claim 1, and further comprising means coupled to said accumulator output and adapted to be coupled to fluid dispensing pump means for stopping said fluid dispensing pump means in response to said accumulator having no information signals stored therein, a change circuit coupled to said pulse circuit for dispensing money change in response to pulses produced by said pulse circuit, flow control means coupled to said accumulator output and adapted to be coupled to a fluid dispensing pump for reducing the rate of fluid dispensed by said fluid dispensing pump in response to the amount of information signals in said accumulator being reduced to a selected magnitude, and means coupled between said money counter and said pulse circuit for rendering said pulse circuit inoperative until a selected number of pulses have been received at said money counter input from said pulse producing means of a pump.

17. The improved control device of claim 1, and further comprising a change circuit coupled to said pulse circuit for dispensing money change in response to pulses produced by said pulse circuit, flow control means coupled to said accumulator output and adapted to be coupled to a fluid dispensing pump for reducing the rate of fluid dispensed by said fluid dispensing pump in response to the amount of information signals in said accumulator being reduced to a selected magnitude, and means coupled between said money counter and said pulse circuit for rendering said pulse circuit inoperative until a selected number of pulses had been received at said money counter input from said pulse producing means of a pump.